United States Patent [19]

Arnold

[11] Patent Number: 5,396,755
[45] Date of Patent: Mar. 14, 1995

[54] HAY CONDITIONING ROLL WITH A REINFORCED ROLL COVER

[75] Inventor: Dale B. Arnold, Anthony, Kans.

[73] Assignee: Morrison Company, Inc., Anthony, Kans.

[21] Appl. No.: 73,131

[22] Filed: Jun. 7, 1993

[51] Int. Cl.⁶ ............................................. A01D 49/00
[52] U.S. Cl. .......................... 56/16.4 B; 56/DIG. 1; 156/184; 156/195
[58] Field of Search ....................... 56/DIG. 1, 1, 16.4, 56/16.4 A, 16.4 B, 16.4 C; 428/224, 225, 255, 286, 287, 295, 909, 492; 118/DIG. 11, DIG. 15; 156/187, 188, 190, 195, 184, 446, 448

[56] References Cited

U.S. PATENT DOCUMENTS

| | | | |
|---|---|---|---|
| 3,210,825 | 10/1965 | Johnston | 56/DIG. 1 X |
| 4,075,822 | 2/1978 | Heckley et al. | |
| 4,150,524 | 4/1979 | Sawyer | 56/DIG. 1 X |
| 4,544,426 | 10/1985 | Stockman | 156/195 X |
| 4,637,201 | 1/1987 | Pruitt et al. | |
| 4,903,463 | 2/1990 | Linde et al. | |
| 4,905,459 | 3/1990 | Seymour et al. | |
| 4,992,314 | 2/1991 | Saitoh | 428/492 X |
| 5,047,276 | 9/1991 | Chomarat et al. | 428/287 X |
| 5,049,610 | 9/1991 | Takaki et al. | 524/514 |
| 5,068,137 | 11/1991 | Ozawa et al. | 428/287 X |
| 5,142,848 | 9/1992 | Seymour | |
| 5,223,061 | 6/1993 | Navaux | 428/295 X |

OTHER PUBLICATIONS

Tire Equipment, Inc. Roll Covering Manual 1-23.
Moody Making it with Strip through Automation 31-32 Jul. 1983.

Primary Examiner—Ramon S. Britts
Assistant Examiner—James A. Lisehora
Attorney, Agent, or Firm—Arnold, White & Durkee

[57] ABSTRACT

A reinforced elastomer cover for use on conditioning rolls in harvesting machines for conditioning crop material. The roll cover comprises one or more layers or plies of reinforcing material interspersed between and bonded to layers of the elastomer. The reinforcing material preferably comprises fibers of synthetic polymers or glass. The reinforced elastomer sheets are placed on roll cores and bonded or otherwise secured to the outer periphery of the roll core. The reinforced elastomer sheets are also molded or machined to possess the desired tread pattern. The sheets may be assembled and bonded directly on a roll core and thereafter vulcanized; or the vulcanized sheets may be bonded or otherwise secured to the cores.

14 Claims, 2 Drawing Sheets

HAY CONDITIONING ROLL WITH A REINFORCED ROLL COVER

BACKGROUND OF THE INVENTION

1. Field of the Invention

The present invention relates generally to hay harvesting machinery and more particularly, to an apparatus for conditioning hay after it has been severed as a crop. The invention especially concerns a roll cover for use on rollers in a hay conditioner.

2. Description of the Related Art

Hay harvesting machines, also referred to as mower-conditioners, windrowers, dismower-conditioners, or hay swathers, use a crop harvesting header to sever the hay crop from the ground and convey it rearwardly to a conditioning mechanism. The conditioning mechanism operates to crush or crimp the severed crop at spaced apart intervals along the stem of the crop to facilitate the drainage of liquids from the crop. The dried crop may then be baled and removed from the field.

The conditioning mechanism typically employs a pair of counter-rotating, intermeshing rollers with some form of a lobed surface. The lobed surface of each roller typically comprises radially extended lugs or lobes, separated by grooves. The lobed surface of each roller meshes with a mating surface of the opposite counter-rotating roller.

The radial lug of the lobed surface may rotate about the roller axis as a continuous spiral for the entire length of the roller. Alternatively, the lobed surface of each roller may comprise a series of discontinuous lugs to form a pattern such as a helix with a defined lead, or a chevron or herringbone type pattern. Additionally, the conditioning roll surface may comprise a series of intermeshing raised geometric patterns.

The purpose of the conditioning rolls is to crush or break open the waxy stems of the plant crop material to promote rapid drying of the crop material for packaging and transport. The process of conditioning the crop material between the counter-rotating conditioning rolls creates abrasive wear to the surface of the conditioning rolls due to frictional and impinging forces upon the roll surfaces. The frictional and impinging wear of the conditioning roll surface is often dependent on such factors as the amount of material fed into the rollers, the amount of dusty or silty residues on the crop, the length of the crop stems, the rotation speed of the conditioning rolls, and the presence of foreign materials in the crop material.

Current elastomer covered conditioning rolls wear and polish quickly, creating worn areas or regions on the roll cover surfaces that reduce the conditioning action intended to be carried out by the lugs. The abrasion resistance can be increased by using higher cost elastomers, such as the urethane group of elastomers. However, the cost increase of the material is disproportionately high in relation to the increase in operational life of the conditioning roll cover. Metal conditioning rolls have also been used in high abrasion wear conditions, but the metal rolls are higher in cost and cause a loss in conditioning performance due to crop slippage through the rolls.

SUMMARY OF THE INVENTION

The present invention in a general aspect comprises an improved roller for use in hay conditioning machinery. The periphery of the roller comprises one or more layers or plies of reinforcing material interspersed between and bonded to layers of elastomer. The outermost surface of the roller preferably has a tread pattern which is capable of meshing with a similar surface of a second roller to form a path through which a grain must pass. The tread pattern is selected to advance the grain along the path and also condition the grain as the rollers rotate on their axes.

The reinforcing material of the invention preferably comprises fibers of synthetic polymers or glass. Preferred polymers include polyamides (Nylon), polyesters, aramids (Kevlar) and polyvinyl compounds. Fiberglass is also preferred. The fibers are preferably woven to form a fabric, especially in a square woven, open weave. Particularly preferred is a woven, leno-type weave.

The reinforced elastomeric materials of the invention are preferably made by sandwiching plies of the reinforcing material between layers or skins of the elastomer. Bonding agents are preferably employed to bond the plies and layers together, and the resulting assemblies are vulcanized. The assemblies are also molded or machined to possess the desired tread pattern.

The reinforced elastomeric sheets are placed on roll cores and bonded or otherwise secured to the outer periphery of the roll cores. The sheets may be assembled and bonded directly on a roll core and thereafter vulcanized; or the vulcanized sheets may be bonded or otherwise secured to the cores.

DESCRIPTION OF PREFERRED EMBODIMENTS

A roll cover of the present invention is preferably comprised of a woven, leno-type weave of a reinforcing material which is incorporated into an elastomer, such as a styrene-butadiene rubber, natural rubber blend, or styrene-butadiene/natural rubber blend. The reinforcing material is typically a square woven, open weave fabric of fibers of synthetics such as polyesters, polyvinyls, polyamides (Nylon) or aramids (Kevlar). The reinforcing fiber may also be a layer of nonwoven fabric, or free fibers of about ⅛ inch to ½ inch in length. The preferred length of the free fibers is about ⅜ inch.

Figure 1:
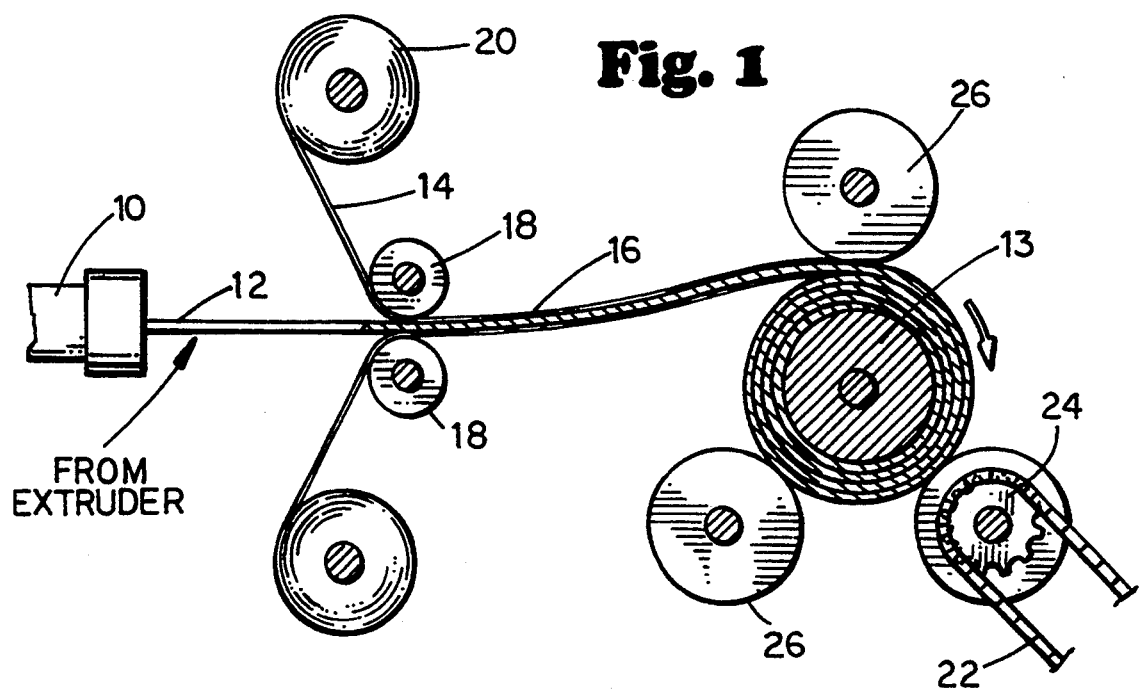
FIG. 1 is a schematic side view of apparatus illustrating a method of wrapping a roll core with a calendered sheet of elastomer.
Figure 2:
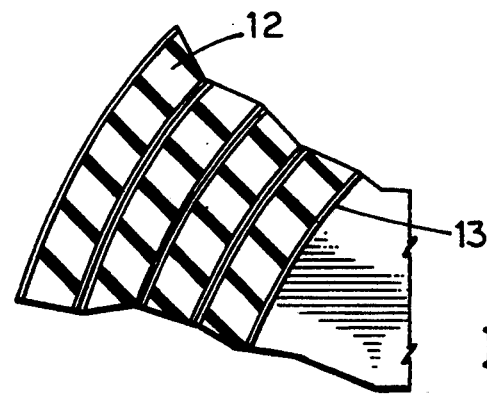
FIG. 2 is partial, cross-sectional view of a roll core covered with several layers of a roll cover of the invention.

One method of practicing the invention employs a technique commonly referred to as calendered sheet wrapping. Referring to FIGS. 1 and 2, a fresh sheet of elastomer 12 is extruded from an extruder 10 through calender rollers 18. The thickness of the sheet of elastomer is typically between about 0.060 inch and 0.250 inch. The preferred thickness is about 0.125 inch. Prior to entering the rollers, the sheet of elastomer 12 is meshed with one or more plies or sheets of reinforcing material 14. The reinforcing material 14 may contain an adhesive coating such as resorcinol-formaldehyde latex for thermoplastic fibers, or silane for fiberglass fibers, to promote bonding of the reinforcing material to the elastomer. As shown in FIG. 1, two plies of reinforcing material 14 are dispensed by feed rolls 20, and are contacted with opposite surfaces of the sheet of elastomer 12. The combined sheets of elastomer 12 and reinforcing material 14 are then passed between the calender rolls 18, where they are meshed or otherwise bonded together. The resulting calendered and reinforced sheet of elastomer 16 is wrapped around a roll core 13. The roll core may be prepared by means of several widely known practices to bond to the reinforced elastomer cover. Roll core 13 is mounted on a suitable shaft which is rotated as shown in FIG. 1, as by a chain drive 22 through a sprocket 24 and gearing or other suitable power transmission system. Rollers 26 help to ensure adequate bonding or joining of the layers of reinforced elastomer to one another and to the roll core 13. In another embodiment, not all layers of elastomer need to contain reinforcement, only the outer layers of the roll surface need to contain reinforcing. The abrasive action of the end use would determine the extent of the reinforcement introduction.

In the preferred embodiment, the width of the resulting calendered and reinforced sheet of elastomer is approximately between one and two inches. In particular, a width of one inch is preferred. In another embodiment, the calendered, reinforced sheet 16 is wide enough to cover the entire length of the roll core 13. However, if the sheet is too wide, it may be sliced or otherwise trimmed to be fitted to the roll core. The reinforced elastomer sheet 16 is wrapped around the roll core 13 until the desired thickness of the roll cover is reached. The use of a twisted, untwisted, or woven cord of reinforcing material may be used in place of a woven fabric. Additionally, free reinforcing fibers may be used. The preferred free fibers are fiberglass fibers which are ⅜ inch in length. As noted earlier, the cord is typically made of polyester, Nylon, Kevlar, polyvinyl alcohol, or fiberglass.

After the elastomer is applied to the roll core, one of several common methods of curing or vulcanizing the elastomer may be used, such as autoclaving. The reinforced elastomer covered roll may be wrapped with a shrinking tape or left as is and be placed into a heating vessel until vulcanization is complete. The elastomer, however, may be a thermoplastic material which hardens upon cooling to ambient temperatures. In any case, the outer surface of the cooled and vulcanized reinforced elastomer roll cover is typically machined to a desired tread pattern. The tread pattern may also be accomplished through compression molding. As indicated earlier, various patterns have been widely accepted, such as the helix, chevron or herringbone patterns.

FIG. 2 is a partial cross-sectional view of a reinforced roll cover after it has been applied to the roll core. The view shows multiple layers or plies of reinforcing material 18 and elastomer sheets 12.

Another method of installing a reinforced elastomer roll cover involves strip rollbuilding. In this process, the reinforcing material is incorporated into the elastomer by wrapping a ply of the woven reinforcing fabric onto a freshly extruded warm strip of elastomer, and concurrently applying both the reinforcing material and elastomer around and along a common roll core.

The extruded strip of elastomer is typically hot and tacky to readily allow the woven reinforcing material to adhere to the strip of elastomer as both are applied to a common roll core. The reinforcing material may contain an adhesive coating such as resorcinol—formaldehyde latex for thermoplastic fibers, or silane for fiberglass fibers, to promote bonding to the elastomer.

The roll core may be prepared by means of several widely known practices to bond to the reinforced elastomer cover. Successive strips of freshly extruded elastomer and woven reinforcing plies are pressed together, or kneaded, into the previous elastomer and reinforcing strips to build the roll cover. As the proper diameter is reached, the building of the roll cover proceeds axially from one end of the roll core to the other end. The width of the reinforcing ply is typically about ¾ of the width of the elastomer strip.

Figure 3:
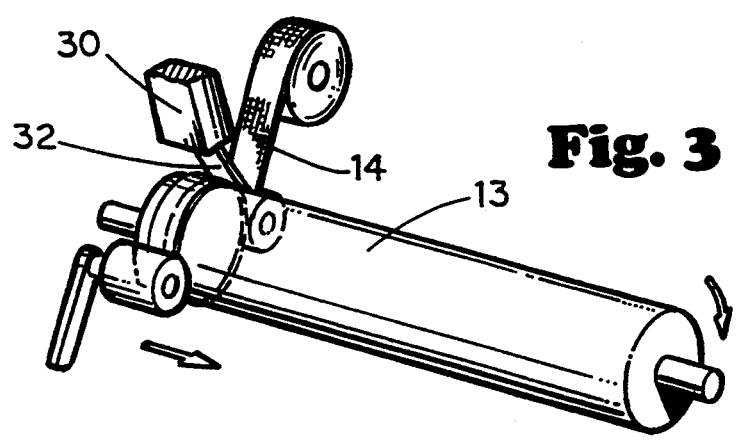
FIG. 3 is a schematic, perspective view of apparatus illustrating a strip roll building process for covering a roll core.
Figure 4:
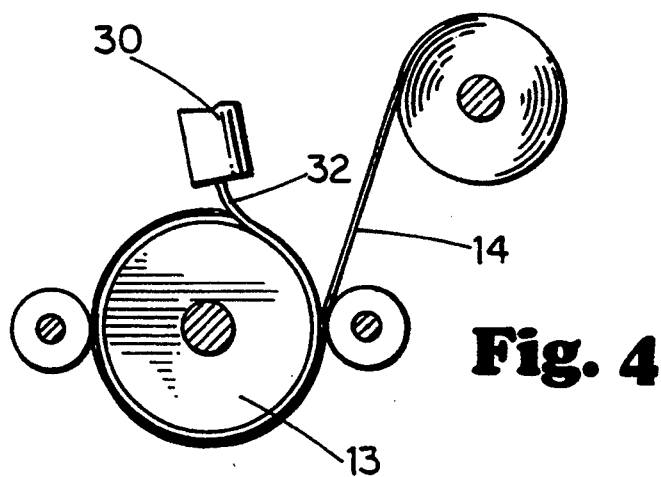
FIG. 4 is a partial, end view of the apparatus of FIG. 3.

FIG. 3 shows a perspective view of the strip roll-building process. In this process, an extruding device 30 applies a freshly extruded elastomer strip 32 directly onto a roll core 13 while concurrently applying a reinforcing material 14. The resulting roll cover has alternate layers of elastomer strip 32 and reinforcing material 14. FIG. 4 shows a cross-sectional view of the strip roll building process wherein an extruding device 30 applies a freshly extruded elastomer strip 32 directly onto a roll core 13 while concurrently applying a reinforcing material 14.

Figure 5:
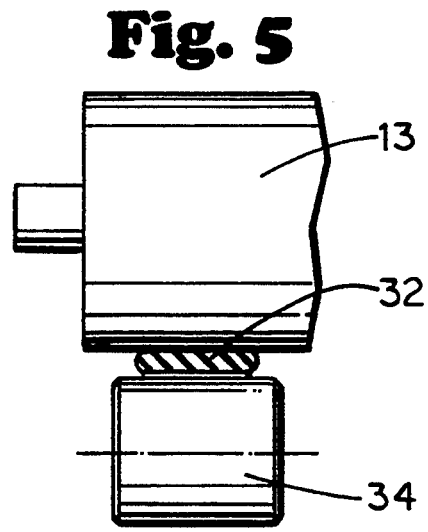
FIGS. 5, 6 and 7 are three successive side views of a portion of a roll core depicting the building of a roll cover on the roll core.
Figure 6:
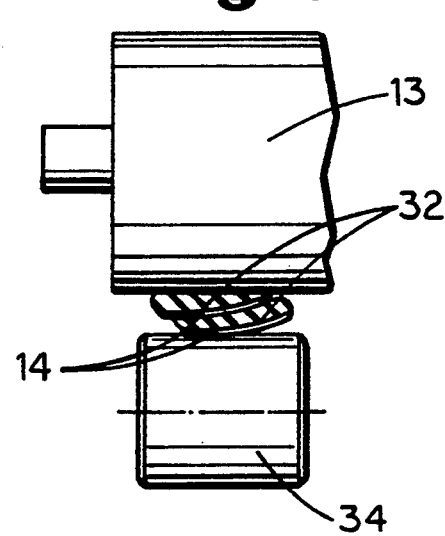
Figure 7:
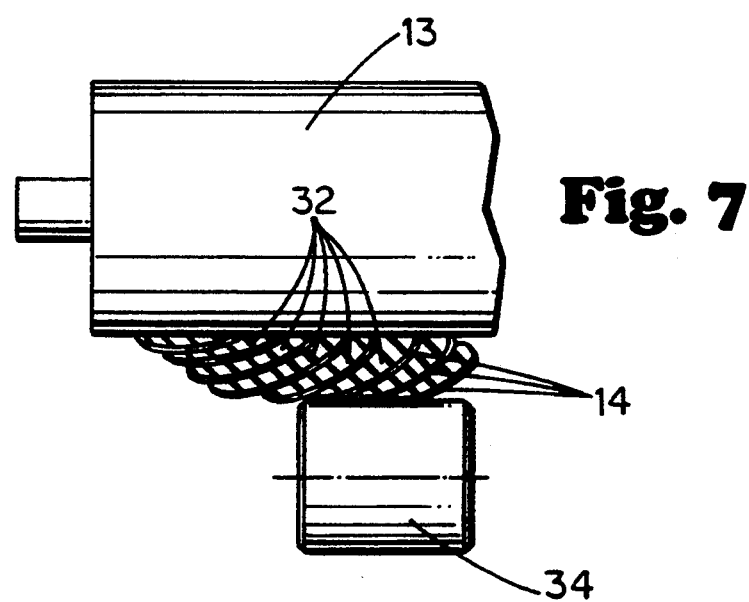

FIGS. 5, 6 and 7 show the building of successive strips of freshly extruded elastomer 32 and reinforcing material 14 onto a roll core 13. An extruding device 34 applies a freshly extruded elastomer strip 32 directly onto the roll core 13, while concurrently applying a reinforcing material 14. The building of the roll cover proceeds axially from one end of the roll core 13 to the other end, until the proper diameter of the roll cover is reached.

While the invention is susceptible to various modifications and alternative forms, specific embodiments have been shown by way of example in the drawings and described in detail herein. However, it should be understood that the invention is not intended to be limited to the particular forms disclosed. Rather, the invention is to cover all modifications, equivalents and alternatives following within the spirit and scope of the invention as defined by the appended claims.

What is claimed is:

1. A hay conditioning roll, comprising:
 a roll core having an outer cylindrical surface; and a roll cover mounted on the cylindrical outer surface, said roll cover comprising at least one layer of elastomer having top and bottom surfaces; a layer of reinforcing material bonded to each of said top and bottom surfaces; and said roll cover having an outer surface defining a tread configured to condition hay upon meshing with a mating tread on another similar hay conditioning roll.

2. A hay conditioning roll, comprising:
 a roll core having an outer cylindrical surface; and
 a roll cover formed on said outer cylindrical surface of the roll core, said roll cover comprising a plurality of layers of elastomer, each layer of elastomer having a top surface, a bottom surface, and a layer of reinforcing material bonded to each of said top and bottom surfaces and vulcanized; said roll cover having an inner surface contacting said roll core and an outer surface; and said outer surface of the roll cover defining a tread capable of advancing and conditioning hay.

3. The hay conditioning roll of claim 2 wherein the reinforcing material comprises a fabric.

4. The hay conditioning roll of claim 2 wherein the reinforcing material comprises an open-weave fabric.

5. The hay conditioning roll of claim 2 wherein the reinforcing material comprises fiberglass or a synthetic polymer.

6. The hay conditioning roll of claim 5 wherein the synthetic polymer is selected from a group consisting of a polyester, polyamide, polyvinylalcohol and an aramid.

7. The hay conditioning roll of claim 2 wherein the reinforcing material comprises an open-weave fabric selected from a group consisting of:
 (a) a polyamide;
 (b) a polyester;
 (c) an aramid;
 (d) polyvinyl alcohol; and
 (e) fiberglass.

8. The hay conditioning roll of claim 2 wherein the reinforcing material is a cord of material selected from a group consisting of:
 (a) polyamide;
 (b) polyester;
 (c) aramid;
 (d) polyvinyl alcohol; and
 (e) fiberglass.

9. The hay conditioning roll claim 2 wherein the layers of elastomer and reinforcing material are bonded together by an adhesive.

10. The hay conditioning roll of claim 9 wherein the adhesive comprises a resorcinol-formaldehyde latex adhesive.

11. The hay conditioning roll of claim 9 wherein the adhesive comprises a silane adhesive.

12. The hay conditioning roll of claim 2 wherein the layers of elastomer and reinforcing material are radially mounted on and along a roll core from end to end.

13. The hay conditioning roll of claim 2 wherein the width of the layer of reinforcing material is less than the width of the layer of elastomer.

14. A method of making a hay conditioning roll having a roll core and a roll cover, said roll cover having an outermost surface, comprising the steps of:
 (a) extruding a sheet of elastomer;
 (b) coating the sheet of elastomer with adhesive;
 (c) concomitantly wrapping the sheet of elastomer and a reinforcing material on the roll core under conditions to mesh the reinforcing material onto the sheet of elastomer;
 (d) repeating steps (a)-(c), as needed, until the wrapped roll reaches a selected diameter with an outermost surface;
 (d) curing the elastomer; and
 (e) molding or machining the outermost surface of the wrapped roll to a desired tread pattern.

* * * * *

UNITED STATES PATENT AND TRADEMARK OFFICE
CERTIFICATE OF CORRECTION

PATENT NO. : 5,396,755
DATED : March 14, 1995
INVENTOR(S) : Dale B. Arnold

It is certified that error appears in the above-indentified patent and that said Letters Patent is hereby corrected as shown below:

Column 6, line 1, claim 9, after "roll", insert --of--.

Signed and Sealed this

Twenty-first Day of November, 1995

Attest:

BRUCE LEHMAN

Attesting Officer

Commissioner of Patents and Trademarks